(12) United States Patent
Hotelling et al.

(10) Patent No.: US 7,916,467 B2
(45) Date of Patent: Mar. 29, 2011

(54) METHODS AND APPARATUSES FOR DOCKING A PORTABLE ELECTRONIC DEVICE THAT HAS A PLANAR LIKE CONFIGURATION AND THAT OPERATES IN MULTIPLE ORIENTATIONS

(75) Inventors: Steve Hotelling, San Jose, CA (US); Gus Pabon, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/732,061

(22) Filed: Mar. 25, 2010

(65) Prior Publication Data

US 2010/0177476 A1 Jul. 15, 2010

Related U.S. Application Data

(63) Continuation of application No. 12/030,201, filed on Feb. 12, 2008, now Pat. No. 7,715,187, which is a continuation of application No. 11/200,787, filed on Aug. 9, 2005, now Pat. No. 7,352,567.

(51) Int. Cl.
*G06F 1/16* (2006.01)

(52) U.S. Cl. ......... 361/679.41; 361/679.02; 361/679.06; 439/165; 439/341; 320/108; 320/115

(58) Field of Classification Search ............. 361/679.01, 361/679.02, 679.06, 679.21, 679.4, 679.26, 361/679.3, 679.32, 679.41, 679.52; 248/122.1, 248/923, 179, 346.1, 346, 918, 489, 510, 248/279; 312/223.1, 223.2, 223.3, 235 A; 439/159, 165, 142, 341, 188, 504; 710/303; 336/83, 130, 212

See application file for complete search history.

(56) References Cited

U.S. PATENT DOCUMENTS

| | | | |
|---|---|---|---|
| 4,321,572 A | | 3/1982 | Studer et al. |
| 4,404,559 A | * | 9/1983 | Renner ................... 340/870.28 |
| D321,179 S | | 10/1991 | Oyama |
| D322,063 S | | 12/1991 | Oyama |
| 5,229,652 A | | 7/1993 | Hough |
| 5,375,226 A | | 12/1994 | Sano et al. |
| 5,434,964 A | | 7/1995 | Moss et al. |
| 5,455,466 A | | 10/1995 | Parks et al. |
| 5,734,254 A | | 3/1998 | Stephens |
| 5,774,233 A | * | 6/1998 | Sakamoto ................... 358/451 |
| 5,864,708 A | | 1/1999 | Croft et al. |

(Continued)

FOREIGN PATENT DOCUMENTS

JP  2-5085261 A  3/2005

(Continued)

OTHER PUBLICATIONS

"Electric Vehicle (EV) Charging Information", 2004, Pasadena Water & Power, http://www.ci/pasadena.ca.us/waterandpower/program.sub.--ev.sub.---evcharging.sub.--inductive.asp, 1 pg.

(Continued)

*Primary Examiner* — Michael V Datskovskiy
(74) *Attorney, Agent, or Firm* — Kilpatrick Townsend & Stockton LLP

(57) ABSTRACT

A docking system is disclosed. The docking system includes a portable electronic device capable of operating in multiple orientations including vertical and horizontal. The docking system also includes a docking station configured to mechanically accept and operatively interface with the portable electronic device in any of its multiple orientations including vertical and horizontal.

18 Claims, 12 Drawing Sheets

U.S. PATENT DOCUMENTS

| | | | |
|---|---|---|---|
| 5,941,493 | A | 8/1999 | Cheng |
| 5,949,155 | A | 9/1999 | Tamura et al. |
| 6,075,433 | A * | 6/2000 | Ono et al. .................... 336/212 |
| 6,193,546 | B1 | 2/2001 | Sadler |
| 6,716,058 | B2 | 4/2004 | Youn |
| 6,819,013 | B2 | 11/2004 | Kelly et al. |
| 6,856,506 | B2 | 2/2005 | Doherty et al. |
| 6,870,475 | B2 | 3/2005 | Fitch et al. |
| 6,897,756 | B2 | 5/2005 | Haisch |
| 6,906,495 | B2 | 6/2005 | Cheng et al. |
| 6,910,634 | B1 | 6/2005 | Inose et al. |
| 6,913,477 | B2 | 7/2005 | Dayan et al. |
| 6,914,197 | B2 | 7/2005 | Doherty et al. |
| 6,952,343 | B2 | 10/2005 | Sato |
| 7,014,486 | B1 | 3/2006 | Wu et al. |
| 7,052,296 | B2 | 5/2006 | Yang et al. |
| 7,054,145 | B2 | 5/2006 | Tanaka et al. |
| 7,065,658 | B1 | 6/2006 | Baraban et al. |
| 7,068,496 | B2 | 6/2006 | Wong et al. |
| 7,200,702 | B2 * | 4/2007 | Keely et al. .................... 710/303 |
| 7,209,124 | B2 * | 4/2007 | Hunt et al. .................... 345/173 |
| 7,212,414 | B2 | 5/2007 | Baarman |
| 7,233,137 | B2 | 6/2007 | Nakamura et al. |
| 7,248,892 | B2 | 7/2007 | White et al. |
| 7,350,011 | B2 * | 3/2008 | Keely et al. .................... 710/303 |
| 7,352,567 | B2 | 4/2008 | Hotelling et al. |
| 7,399,202 | B2 | 7/2008 | Dayan et al. |
| 7,477,039 | B2 | 1/2009 | Rodarte |
| 7,511,452 | B2 | 3/2009 | Bersenev |
| 7,567,059 | B2 * | 7/2009 | Rosal et al. .................... 320/115 |
| 7,580,255 | B2 | 8/2009 | Crooijmans et al. |
| 7,627,343 | B2 | 12/2009 | Fadell et al. |
| 7,715,187 | B2 | 5/2010 | Hotelling et al. |
| 7,719,830 | B2 | 5/2010 | Howarth et al. |
| 2003/0091118 | A1 * | 5/2003 | Lohr .................... 375/258 |
| 2004/0145342 | A1 | 7/2004 | Lyon |
| 2004/0233930 | A1 | 11/2004 | Colby, Jr. |
| 2005/0047055 | A1 | 3/2005 | Kelly et al. |
| 2005/0055487 | A1 | 3/2005 | Tanaka et al. |
| 2005/0083012 | A1 | 4/2005 | Lee et al. |
| 2005/0162824 | A1 | 7/2005 | Thompson |
| 2005/0168422 | A1 | 8/2005 | Oh et al. |
| 2006/0159158 | A1 | 7/2006 | Moore et al. |

FOREIGN PATENT DOCUMENTS

| | | |
|---|---|---|
| KR | 2003017033 A | 3/2003 |
| KR | 2003094542 A | 12/2003 |

OTHER PUBLICATIONS

"Tech Wow!", Sensors Online, http://www.sensorsmag.com/techwow/consumer/main.shtml, 4 pgs., 2005.

"Custom Power Solutions", M Power, http://www.mpoweruk.com/chargers.htm, 11 pgs., 2005.

"Era Innovative: The Universal Inductive Charging System" http://www.era.de/englisch/news/.sub.--induktiv.htm, 1 pg., 2005.

"Inductive Charging", Salcomp, http://www.salcomp.com/research/inductivecharging.asp, 1 pg., 2005.

"Halfbakery: Power Spots", http://www.halfbakery.com/idea/Power.sub.--20Spots, 3 pgs., 2005.

Office Action dated Mar. 19, 2007 from U.S. Appl. No. 11/200,787, 7 pages.

Office Action dated Aug. 26, 2009 from U.S. Appl. No. 12/030,201, 15 pages.

Office Action dated Jun. 10, 2009 from U.S. Appl. No. 12/030,201, 9 pages.

Office Action dated Feb. 24, 2009 from U.S. Appl. No. 12/030,201, 8 pages.

* cited by examiner

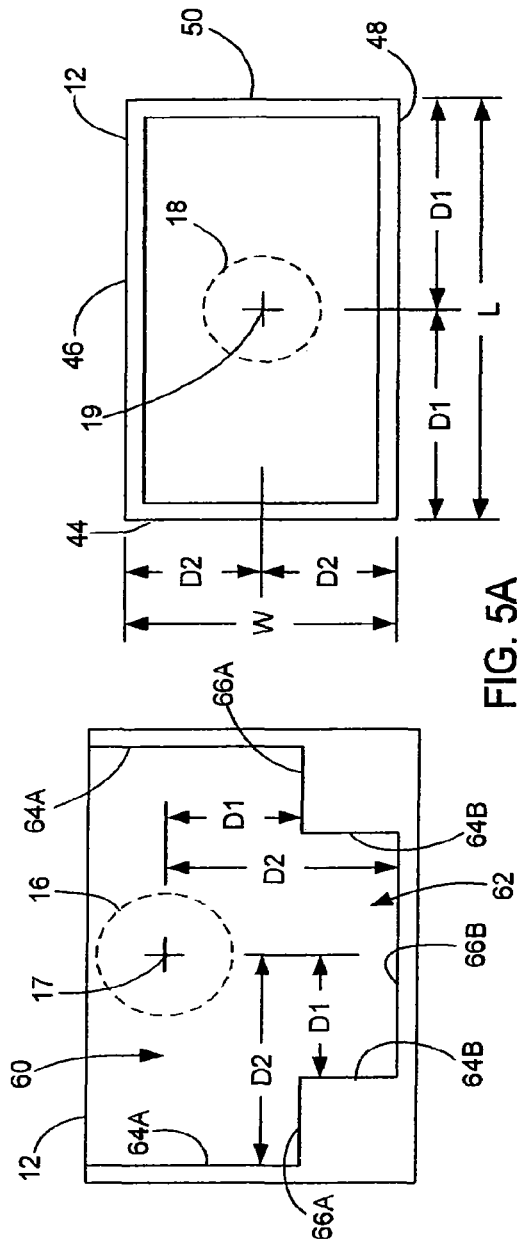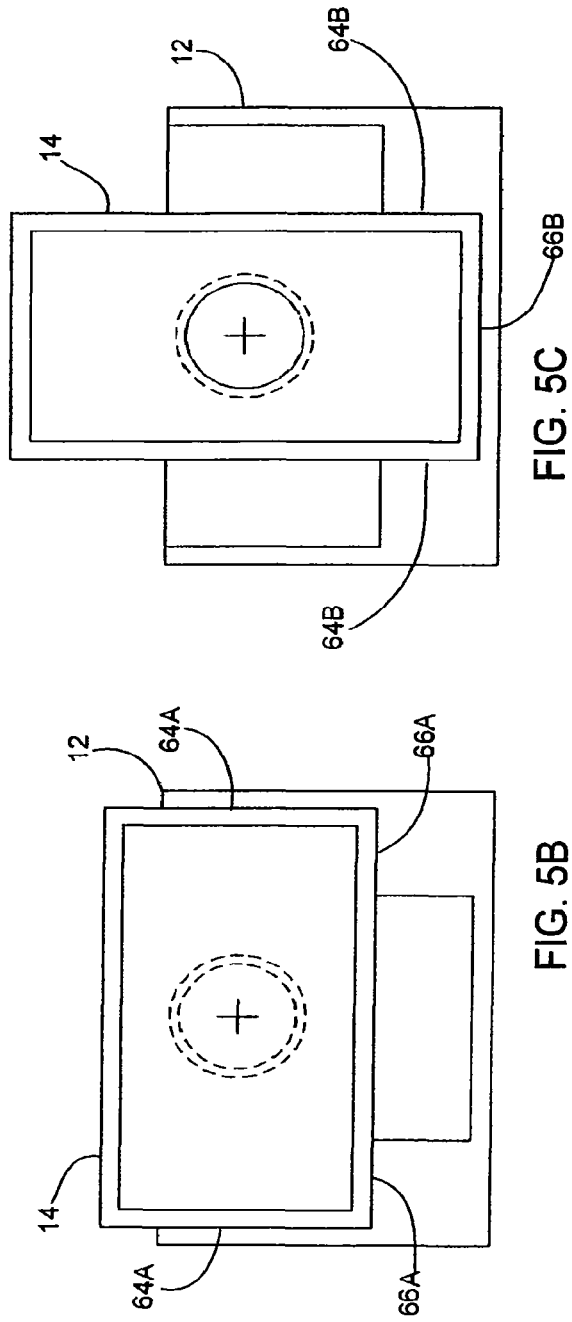

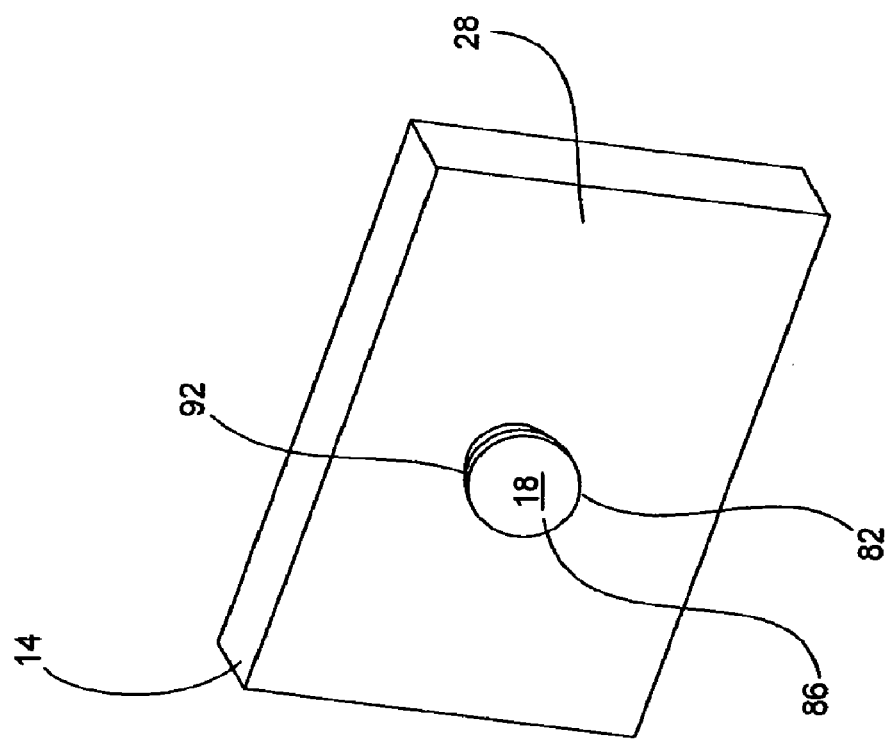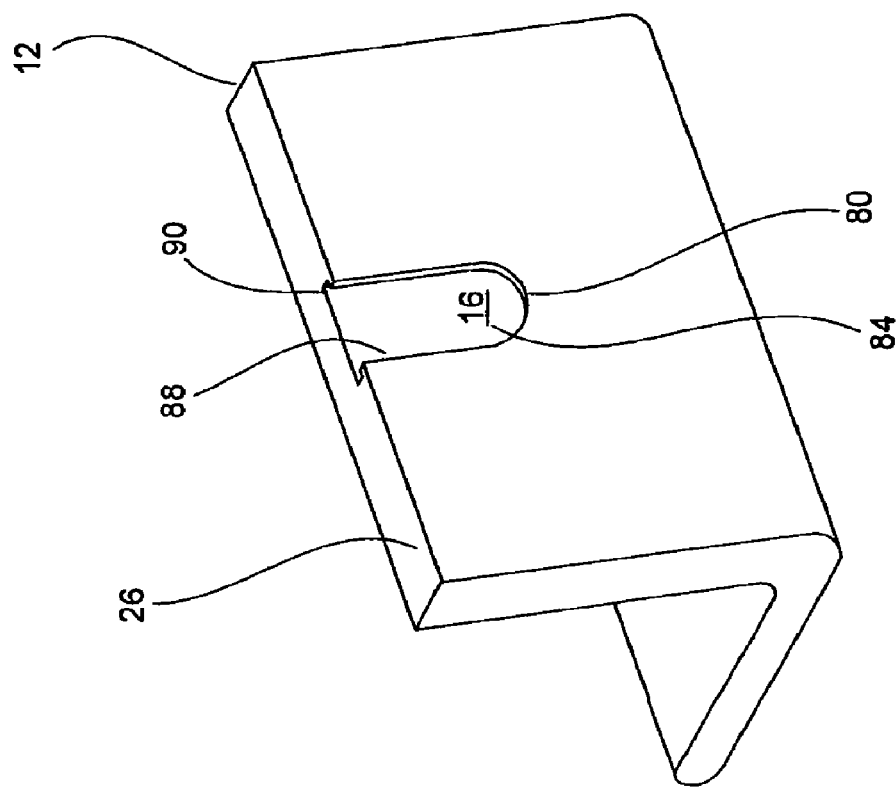
FIG. 7

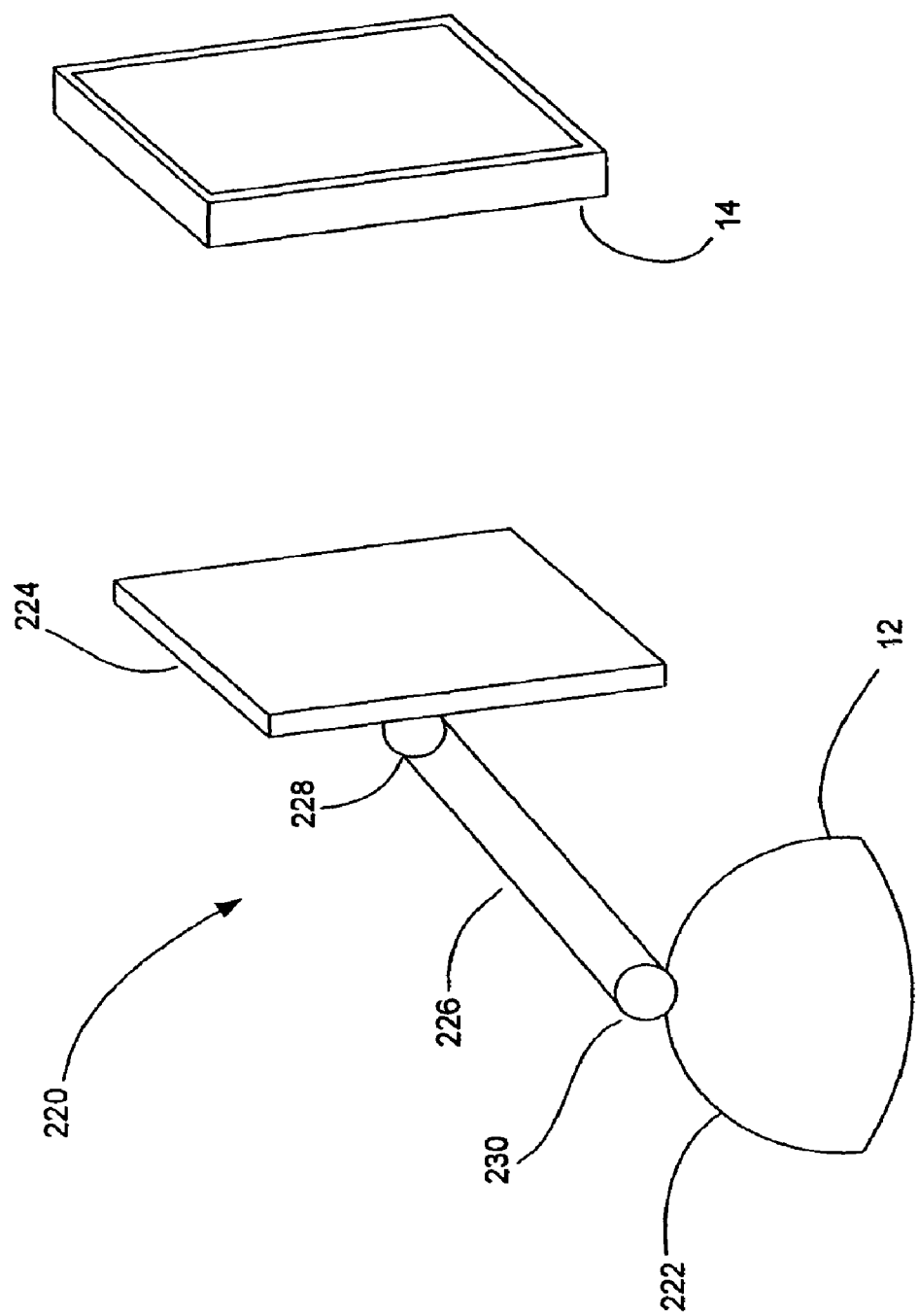

METHODS AND APPARATUSES FOR DOCKING A PORTABLE ELECTRONIC DEVICE THAT HAS A PLANAR LIKE CONFIGURATION AND THAT OPERATES IN MULTIPLE ORIENTATIONS

The present application claims priority from and is a continuation application of U.S. application Ser. No. 12/030,201, filed Feb. 12, 2008, which is a continuation application of U.S. application Ser. No. 11/200,787, filed Aug. 9, 2005 (now U.S. Pat. No. 7,352,567), the entire contents of which are herein incorporated by reference for all purposes.

FIELD OF THE INVENTION

The present invention relates generally to docking stations for portable electronic devices. More particularly, the present invention relates to docking stations for portable electronic devices, which have planar like configurations and that operate in multiple orientations. Even more particularly, the present invention relates to improved techniques for transferring data and/or power between portable electronic devices and the docking stations.

BACKGROUND OF THE INVENTION

Many electronic devices include a docking station for providing a convenient interface for transferring data between the electronic device and other devices, such as a computers, speakers, monitors, and printers. The docking station may also include an interface for connecting to a power source so that the electronic device can be powered or charged (e.g., battery). In most cases, the docking stations include a cavity within which the electronic device is received. The cavity is configured to have a size and shape that coincides with the size and shape of the electronic device so that the electronic device rests snuggly within the cavity. Furthermore, the cavity typically includes a connector therein for operatively engaging a port of the electronic device when the electronic device is positioned within the cavity. The connector is typically coupled to the external systems (e.g., computer, power source) through a cable so that communications between the electronic device and the external systems can take place.

Recently, inductive charging units have been implemented in electronic devices, the most famous of which is the Sonic Care toothbrush manufactured by Philips of the Netherlands. The toothbrush and the charging dock form the two part transformer with the primary induction coil contained in the dock and the secondary induction coil contained in the toothbrush. When the end of toothbrush is placed in a cavity of the dock, the complete transform is created and the induced current in the secondary coil charges the battery.

Inductive charging pads have also been developed. The pad works similar to the toothbrush, however, the pad typically includes multiple transformers so that the electronic device can be placed in any orientation on the pad. When the electronic device is placed on the pad, one of the transformers of the pad induces current in the transformer of the electronic device, and this current charges the battery of the electronic device. Unfortunately, the efficiency of the transform is not very good since the transformer located on the electronic device typically does not align with the transformers of the pad, i.e., does not create closed magnetic loop and therefore there is no direct inductive coupling.

SUMMARY OF THE INVENTION

The invention relates, in one embodiment, to a docking system. The docking system includes a portable electronic device capable of operating in multiple orientations including vertical and horizontal. The docking system also includes a docking station configured to mechanically accept and operatively interface with the portable electronic device in any of its multiple orientations including vertical and horizontal.

The invention relates, in another embodiment, to a docking system. The docking system includes a portable electronic device having a front side and substantially planar back side opposite the front side and including a full screen display at the front side and a power transfer mechanism at the substantially planar back side. The full screen display is configured to display content in an upright manner whether the portable electronic device is used horizontally or vertically. The docking system also includes a docking platform having a substantially planar front side configured to support the substantially planar backside of the portable electronic device thereon, and including a power transfer mechanism at the substantially planar front side. The power transfer mechanism of the portable electronic device and power transfer mechanism of the docking platform are aligned along an axis and juxtaposed relative to one another when the portable electronic device is supported by the docking platform. The power transfer mechanism of the portable electronic device and the power transfer mechanism of the docking platform are rotationally symmetric about the axis such that they maintain communication with one another whether the portable electronic device is placed horizontally or vertically on the docking platform.

The invention relates, in another embodiment, to a docking station. The docking station includes a platform that allows a substantially planar portable electronic device to be docked in multiple orientations about an axis. The docking station also includes an interface mechanism located at the platform and configured to interface with a corresponding interface mechanism of the portable electronic device when the portable electronic device is docked to the platform in any of its multiple orientations.

The invention relates, in another embodiment, to a docking station. The docking station includes a substantially planar platform for receiving a substantially planar portable electronic device thereon. The substantially planar platform receives the portable electronic device in a plurality of orientations about an axis. The plurality of orientations includes at least a horizontal orientation and a vertical orientation. The docking station also includes an interface mechanism disposed in the substantially planar platform and having a center located at the axis. The interface mechanism communicates with a corresponding interface mechanism disposed in the substantially planar portable electronic device when the substantially planar portable electronic device is placed on the substantially planar platform in any of the plurality of orientations. The docking station further includes one or more alignment features for aligning a center of the corresponding interface mechanism of the substantially planar portable electronic device with the axis when the substantially planar portable electronic device is placed on the substantially planar platform in any of the plurality of orientations.

The invention relates, in another embodiment, to a portable electronic device configured to operate in multiple orientations including horizontal and vertical orientations. The portable electronic device displays content in an upright manner in both the horizontal and vertical orientations. The portable electronic device has a substantially planar back side for placement on a planar front side of a docking platform in each of its multiple orientations. The portable electronic device includes an interface mechanism located at the back side of the portable electronic device and configured to interface with a corresponding interface mechanism located at the front side of the docking platform when the portable electronic device is placed on the docking platform in any of its multiple orientations.

BRIEF DESCRIPTION OF THE DRAWINGS

The invention will be readily understood by the following detailed description in conjunction with the accompanying drawings, wherein like reference numerals designate like structural elements, and in which:

FIG. 5A is a front view of a docking station, in accordance with one embodiment of the present invention.

FIG. 5B is a front view of a docking station with a horizontally positioned portable electronic device positioned thereon, in accordance with one embodiment of the present invention.

FIG. 5C is a front view of a docking station with a vertically positioned portable electronic device positioned thereon, in accordance with one embodiment of the present invention.

FIG. 7 is a perspective view of a docking system, in accordance with one embodiment of the present invention.

FIG. 13 is a perspective diagram of another docking system, in accordance with one embodiment of the present invention.

DETAILED DESCRIPTION OF THE INVENTION

The invention generally pertains to a docking system that includes a docking station and a planar like portable electronic device, which can be used in multiple orientations (e.g., vertical and horizontal). By way of example, the portable electronic device may include a display that displays content in an upright manner regardless of the orientation of the portable electronic device. One aspect of the invention relates to techniques for mechanically supporting and aligning the portable electronic device with the docking station. Another aspect of the invention relates to techniques for efficiently transferring data and/or power between portable electronic device and the docking station. In one embodiment, the mechanisms used to transfer data and/or power are rotationally symmetric so as to support the various orientations of the portable electronic device when the portable electronic device is docked to the docking station.

Embodiments of the invention are discussed below with reference to FIGS. 1-13. However, those skilled in the art will readily appreciate that the detailed description given herein with respect to these figures is for explanatory purposes as the invention extends beyond these limited embodiments.

Figure 1:
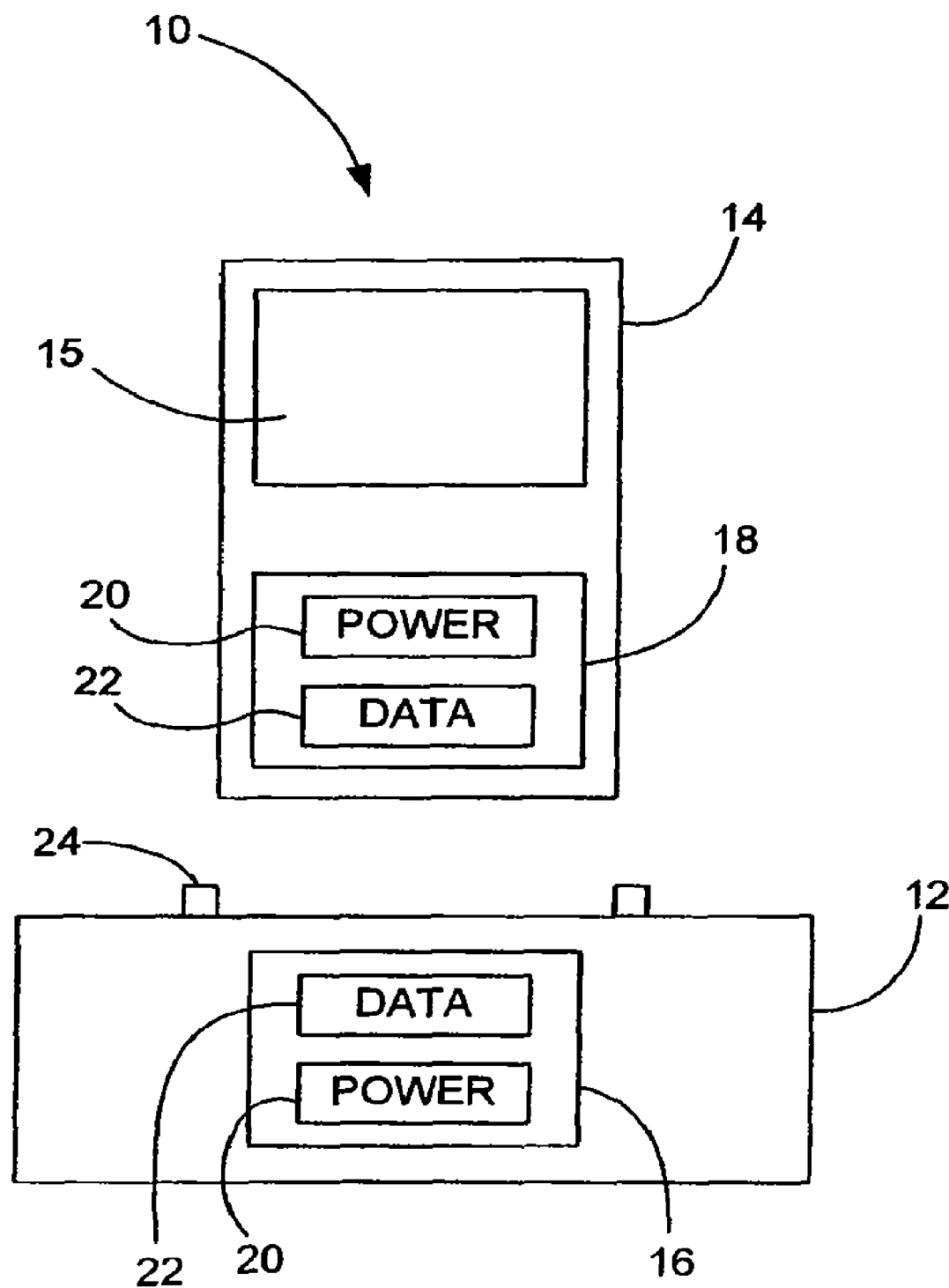
FIG. 1 is a simplified diagram of a docking system, in accordance with one embodiment of the present invention.

FIG. 1 is a simplified diagram of a docking system 10, in accordance with one embodiment of the present invention. The docking system 10 includes a docking station 12 and a portable electronic device 14 that is capable of docking into the docking station 14.

The docking station 12 provides a platform for quickly and easily coupling the portable electronic device 14 to another system or device as for example a computer, a power source, or peripheral devices such as a monitor, a keyboard, speakers, etc. A primary advantage of using a docking station 12 is that the user does not have to separately connect each of these various devices with the portable electronic device.

The portable electronic device 14 may be any electronic device that is easily transported by a user. By way of example, the portable electronic device 14 may generally correspond to computing devices such as laptops, tablet PC's, PDA's, media players (e.g., music players, video players or game players), cell phones, smart phones, GPS device, electronic books, and/or the like.

In one particular embodiment, the portable electronic device 14 is a handheld computing device. As used herein, the term "hand held" means that the electronic device is typically operated while being held in a hand. The hand held electronic device may be directed at one-handed operation and/or two-handed operation. In one-handed operation, a single hand is used to both support the device as well as to perform operations with the user interface during use. Cellular phones, PDAs, cameras, media players, and GPS units are examples of portable devices that can be operated solely with one hand. In the case of a cell phone, for example, a user may grasp the phone in one hand between the fingers and the palm and use the thumb to make entries using keys, buttons or a joy pad. In two-handed operation, one hand is used to support the device while the other hand performs operations with a user interface during use or alternatively both hands support the device as well as perform operations during use. Tablet PCs, electronic books and game players are examples of portable device that are typically operated with two hands. In the case of the tablet PC, for example, the user may grasp the tablet with one hand and make entries in the tablet using the other hand, or alternatively grasp the tablet in both hands and make entries using either or both hands while holding the tablet PC.

More particularly, the portable electronic device 14 may correspond to those portable electronic devices that are embodied in a picture frame format. That is, those devices that are substantially planar and configured with a full screen display or a near full screen display where the display fills up substantially the entire front surface of the portable electronic device 14. It may extend edge to edge or it may fit within a small bezel of the housing at the edge of the device. The full screen display may have a variety of different configurations depending on the overall footprint of the device. If the device 14 is wide, the full screen display may have a traditional aspect ratio of about 4:3. If the device 14 is elongated, the full screen display may have an aspect ratio that is more panoramic such as 16:9. Examples of picture frame electronic devices are tablet PCs, and electronic books. It should be noted, however, that almost any of the devices mentioned above may be configured in this manner. Examples of full screen handheld devices can be found in U.S. Patent Application Nos. 60/658,777, 11/057,050 and 11/115,539, all of which are herein incorporated by reference.

Referring to the docking station 12, the docking station 12 may be a stand alone unit that communicates with other devices or systems through wired or wireless connections, or alternatively, the docking station 12 may be integrated directly into the other devices or systems. In the case of a stand alone unit, the docking station 12 may include connectors, jacks, ports or transceivers that provide external connections to the other devices or systems. In the case of an integrated docking station, the docking station 12 may be hard wired directly to the components of the host device. In either case, the docking station 12 includes a holding system for receiving and supporting the portable electronic device 14 when the portable electronic device 14 is desired to be docked. The holding system may be configured to support the portable electronic device 14 in an upright (e.g., vertical), laid down (e.g., horizontal) or tilted position (e.g., angled) while maintaining/allowing access to the U.I. portion (e.g., at least the display) of the portable electronic device 14.

In one particular embodiment, the docking station 12 is configured like an easel. In this embodiment, the docking station 12 may include a vertical or angled platform on which the backside of the portable electronic device 14 rests when the portable electronic 14 is docked in the docking station 12. This is arrangement is particularly useful with portable electronic devices with a planar like configuration such as those with a full screen display. The docking station 12 may further include a fixed or adjustable leg or arm for supporting the platform and thus the portable electronic device 14 in one or more positions.

Alternatively, the docking station 12 may include a cavity or basin for receiving an edge or end of the portable electronic device 14. Examples of cavity style docking stations can be found in U.S. patent application Ser. Nos. 10/423,490, 11/125,883, both of which are herein incorporated by reference.

In order to operatively connect the portable electronic device 14 with the docking station 12, the docking station 12 may include an interface system 16 that interfaces with a corresponding interface system 18 on the portable electronic device 14 when the portable electronic device 14 is docked in the docking station 12. The interface systems 16 and 18 may be widely varied and may include various mechanisms for transferring data and/or power between the portable electronic device 14 and the docking station 12. For example, each of the systems 16 and 18 may include a power transfer mechanism 20 and a data transfer mechanism 22. When docked, the data transfer mechanisms 22 transfer data between the docking station 12 and the portable electronic device 14. Data can therefore be uploaded or downloaded to and from the portable electronic device 14. Furthermore, the power transfer mechanisms 20 transfer power from the docking station 12 to the portable electronic device 14. The power transfer can be used to power and/or charge the portable electronic device 14 when it is docked. In some cases, the data and power mechanisms are separate components while in other cases the data and power mechanisms are integrated together.

The interfacing systems 16 and 18, including both the data mechanisms 22 and the power mechanisms 20, can be embodied in various forms and combinations including contact based and non-contact based platforms. By way of example, contact based platforms may include electrical contacts that are capable of transferring data and/or power when the electrical contacts are electrically engaged or in contact with one another. Non-contact based platforms, on the other hand, may include inductive devices, optical devices, or wireless devices that are capable of transferring data and/or power without mating contact.

When electrical contacts are used, the electrical contacts may be implemented in connectors and/or they may be surface or flush mounted on the housings of the portable electronic device and the docking station. In either case, each device includes a set of corresponding contacts that when in contact allow data and power to be transferred therethrough. With regards to connectors, the electrical contacts may be tabs that are positioned side by side, or they may be arranged as pins. With regards to flush mounts, the electrical contacts may be flat planar contacts that lie flush on the surface of the housing. In some cases, the flush mounts may be spring-loaded or utilize a flexure in order to ensure mating contact with each other when the portable electronic device is docked. In all of these arrangements, the electrical contacts are separately wired to a control board (e.g., PCB) located inside the respective devices. The control board routes the signals to their desired location within the devices. By way of example, the electrical contacts may be directly or indirectly (e.g., via wires) soldered to the control board. Alternatively a flex circuit may be used.

With regards to non-contact platforms, inductive coils can be placed in each device to transfer both power and data. The inductive coils are typically hidden from view behind the housings of each device and therefore they are more aesthetically pleasing than electrical contacts, which need to be exposed in order to operate effectively. Furthermore, inductively based systems are more robust than electrical contacts. For example, there are no contacts to wear out and/or oxidize.

Wireless devices may include receivers, transmitters, and transceivers of various types including RF, Bluetooth, 802.11 UWB (ultra wide band), and the like. Like inductive devices, wireless devices are typically hidden from view and therefore are more aesthetically pleasing and robust (e.g., fully enclosed with no lines, or breaks in the surface of the housings). Optical devices may include a light source and light detector for data, and a light source and photovoltaics device for power. Each of these devices are typically positioned behind a translucent region of the housing so as to allow proper communication therebetween. With regards to data, an IR link may be used.

The docking system 10 may use any combination of contact and non-contact platforms in order to serve the needs of the portable electronic device 14.

In one particular embodiment, both power and data are transferred with non contact based platforms, and more particularly non contact based platforms that are enclosed such as inductive based systems and wireless systems. In inductive based systems, the docking station 12 includes the primary coil and the portable electronic device 14 includes the secondary coil. In wireless systems, both the docking station 12 and the portable electronic device 14 include their own transceiver that both transmits and receives data. In one implementation, both data and power are transferred via the inductance-based system. For example, low frequency electrical current may be passed from the primary coil to the secondary coil in order to power or charge the portable electronic device and high frequency current may be passed from one coil to the other in order to send/receive data. The data and power inductors may be separate, integral or they may be superimposed on one another. In another implementation, power is transferred via an inductance-based system and data is transferred via a wireless system. The combination of inductance and wireless provides an efficient way to transfer both power and data while keeping both the docking station and portable electronic device fully enclosed.

In some cases, the interfacing systems need to be properly aligned in order to ensure proper connections and therefore efficient power and data transfer between the docking station and the portable electronic device. This is especially important for electrical contacts, inductive transformers and optical devices, and less important for wireless devices. Accordingly, the docking station 12 may include one or more alignment features 24 that help register or align the portable electronic device 14 with the docking station 12 and further to help align the corresponding interface mechanisms with one another. The alignment features 24 may be fixed or adjustable, and may include such elements as pins, shelves, guides, reference surfaces, keyways, and the like. The alignment features 24 may also provide visual alignment clues or fiduciaries for helping the user position the portable electronic device 14 on the docking station 12.

Although not shown, in some cases, the docking system 10 may further include retention mechanisms 25 for securing the portable electronic device 14 to the docking station 12. By way of example, the retention mechanisms 25 may include one or more magnets, snaps, latches, catches, friction couplings, detents, tabs, slots, and/or the like. In some cases, the docking system 10 may even include a lock so that portable electronic device 14 is only removable if the user has the proper key, combination or access code.

Figure 2A:
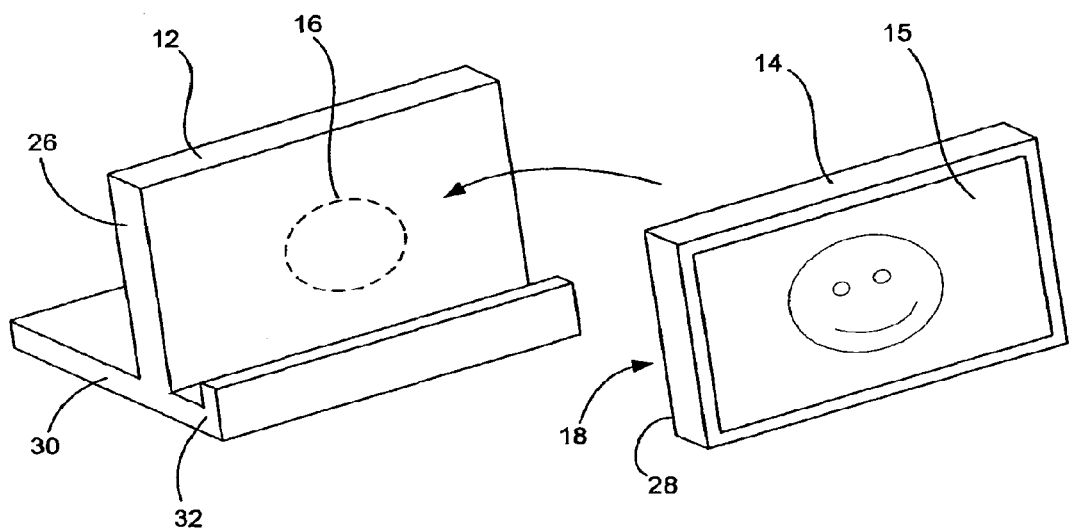
FIG. 2A is a perspective diagram of a docking system including a horizontally positioned portable electronic device, in accordance with one embodiment of the present invention.
Figure 2B:
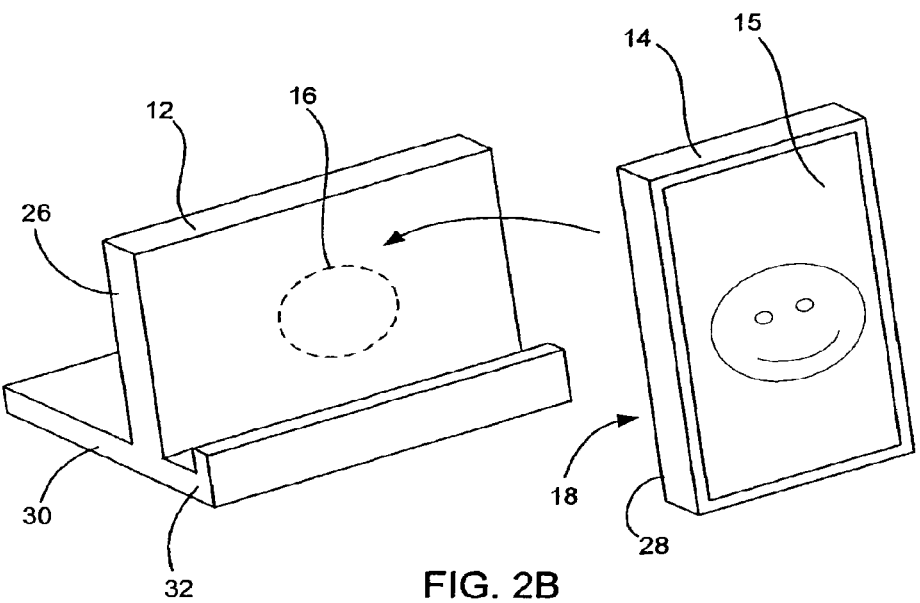
FIG. 2B is a perspective diagram of a docking system including a vertically positioned portable electronic device, in accordance with one embodiment of the present invention.

In accordance with one embodiment, the portable electronic device 14 is capable of operating in multiple orientations about an axis. For example, as shown in FIG. 2A, the portable electronic device 14, which includes a full screen display 15, can operate in a substantially horizontal orientation (0/360 and/or 180), or as shown in FIG. 2B, the portable electronic device 14 can operate in a substantially vertical orientation (90 and/or 270).

In one embodiment, although used in different orientations the content being displayed by the display 15 of the portable electronic device 14 follows the user rather than the orientation of the portable electronic device 14 so that the content is displayed in its correct position relative to the user (e.g., upright). That is, the portable electronic device 14 is capable of displaying content on its display 15 in an upright position no matter what orientation the portable electronic device 14 is in as for example when the device 14 is used horizontally or vertically so that the user can easily view the content. Furthermore, the portable electronic device 14 may be capable of switching the viewing mode on the display 15, including landscape and portrait modes, based on the orientation of the portable electronic device 14. For example, landscape mode may be used when the device 14 is oriented horizontally, and portrait mode may be used when the device 14 is oriented vertically. Picture frame devices are good examples of devices that can be used in this manner. It should be noted however that this is not a requirement and that any device with a display can be configured to operate in this manner.

The function of adjusting the orientation and mode of the content being displayed may be performed manually as part of a user selection or automatically as the user reorients the device.

When performed manually, the user may select what orientation and mode to display the content based on how the user is going to orient the device. For example, if the user is going to use the device horizontally, the user may place the viewing orientation in horizontal and landscape modes and if the user is going to use the device vertically, the user may place the viewing orientation in vertical and portrait modes.

When performed automatically, the device itself may determine what orientation to display the content based on the orientation of the device. By way of example, the portable electronic device may include an accelerometer that helps determine the orientation of the device. The accelerometer senses the orientation of the device, and informs the control system of the portable electronic device 14 so that the displayed content can be kept upright and in the right viewing mode. The control system can make the adjustments over a wide range including for example device orientations anywhere between 0 and 360 degrees, or a subset such as for example device orientations of 0/360, 90, 180 and 270, or further a subset of just 0 and 90 degrees.

In accordance with another embodiment of the present invention, because the device 14 can be used in multiple orientations, the docking station 12 may be configured to support the multiple orientations of the portable computing device 14. That is, the portable electronic device 14 can be positioned on the docking station 12 in any of its orientations while still allowing data and/or power communications to exist therebetween. In some cases, the docking station 12 may provide 360 degree flexibility to the portable electronic device 14. In other cases, the docking station 12 may provide only a subset of 360 degree flexibility such as for example at 0/360, 90, 180, and 270 degrees. Furthermore, the docking station 12 may provide a tighter subset as for example 0/360 and 90 degrees. The positions allotted by the docking station 12 are typically based on the various orientations of the portable electronic device 14. For example, if the portable computing device 14 only supports 0, 90, 180 and 270, then the same can be said of the docking station 12.

In the illustrated embodiments shown in FIGS. 2A and 2B, the docking station 12 is embodied as an easel. The docking station 12 therefore includes a platform 26 for receiving the backside 28 of the portable electronic device 14. In the embodiment shown, the platform 26 includes a substantially flat planar surface that mates with a substantially flat planar backside 28 of the portable electronic device 14. As such, the portable electronic device 14 can rest on or lie on the platform 26 in any of its orientations including the vertical and/or horizontal orientations. The docking station 12 may also include a leg 30 for supporting the platform 26 and thus the portable electronic device 14. In some cases, the platform 26 is fixed to the leg 30 and in other cases the platform 26 can pivot relative to the leg 30 in order to adjust the angle of tilt. The docking station 12 may further include a retention lip 32 that supports the portable electronic device 14 in an upright position adjacent the platform 26, i.e., keeps the back side of the portable electronic device flush with the platform as well as prevents the portable electronic device 14 from slipping off the platform 26. Although a leg and retention lip is shown, it should be appreciated that these are not limitations and that other support mechanisms may be used.

In order to allow communications between the docked portable electronic device 14 and the docking station 12, the docking system of FIGS. 2A and 2B, further include one or more dock side interface mechanisms 16 and one or more device side interface mechanisms 18 that operatively couple with one another to provide communications between the portable computing device 14 and the docking station 12. As mentioned in FIG. 1, the interface mechanisms may be configured to transfer data and/or power between the portable computing device 14 and the docking station 12.

In accordance with one embodiment, the interface mechanisms 16 and 18 are configured to communicate with one another in whatever position the portable electronic device 14 is oriented in relative to the docking station 12. That is, the orientation of the portable computing device 14 is irrelevant to ensure communications between the portable computing device 14 and the docking station 12. The interface mechanisms 16 and 18 operatively couple with one another when the portable computing device 14 rests on the platform regardless of the orientation of the portable computing device 14 thereon. For example, the interface mechanisms 16 and 18 are capable of interfacing with one another if the device 14 is placed at various orientations between 0 and 360 degrees, more particularly at 0/360, 90, 180 or 270 degrees, and even more particularly at 0/360 and 90 degrees relative to the platform 26. In essence, the interface mechanisms are rotationally symmetric so that regardless of the orientation of the portable electronic device relative to the docking station the coupling therebetween still works correctly.

Wireless devices can easily support such an arrangement. For example, the docking station 12 may include a transceiver in its platform 26 or leg 30, and the portable electronic device 14 may include a transceiver inside its housing. The transceivers can be placed anywhere relative to each other and still communicate via a wireless signal.

With regards to non wireless devices, including contact or non contact based, the dock side mechanisms 16 and the device side mechanisms 18 are positioned in a way that they are juxtaposed and aligned in each of the various orientations supported by the portable computing device 14 thereby ensuring an efficient connection between the docking station and the portable electronic device 14.

Figure 3A:
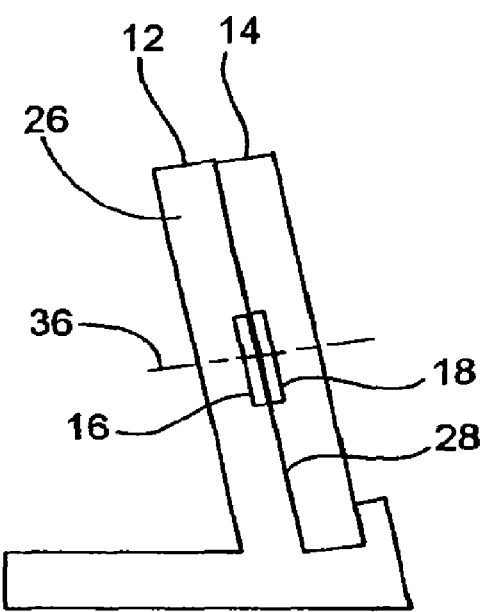
FIGS. 3A and 3B are side views of a docking system, in accordance with one embodiment of the present invention.
Figure 3B:
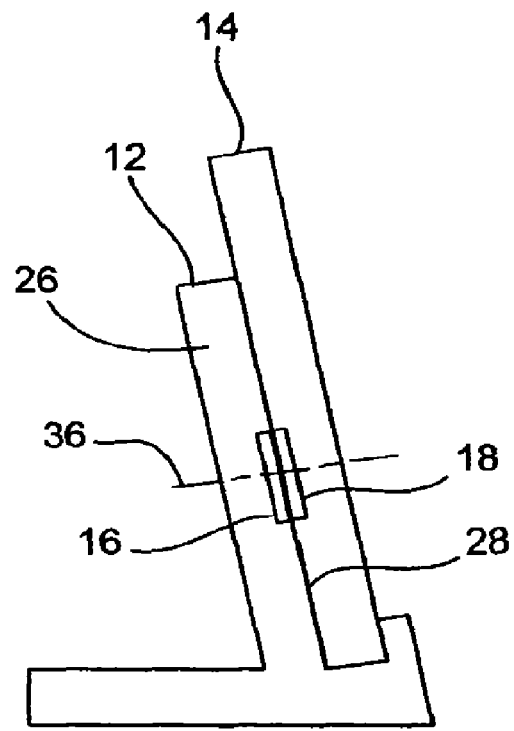

Referring to FIGS. 3A and 3B, the dockside interface mechanisms 16 are located along the planar reference surface of platform 26 and the device side interface mechanisms 18 are located along the planar surface of the backside 28 of the portable computing device 14 thereby allowing them to be adjacent and flush with one another when the portable electronic device 14 is docked to the docking station 12. Furthermore, the dock side mechanisms 16 and device side mechanisms 18 are positioned within their respective planes (e.g., X and Y) so that the axis of each of the interface mechanisms 16 and 18 line up when the portable electronic device 14 is placed on the docking station 12 in each of its orientations including for example horizontal (FIG. 3A) and vertical (FIG. 3B). That is, the device side mechanism 18 aligns with the dock side mechanism 16 in each of the allowed orientations of the portable electronic device including for example the vertical and horizontal orientations. In essence, the interface mechanisms 16 and 18 are configured to be rotationally symmetric about the axis 36 so that the interface elements (e.g., contacts) of the device 14 are in their proper position relative to the interface elements (e.g., corresponding contacts) of the dock 12 in each of the orientations supported by the portable electronic device 14.

Alternatively, multiple interface mechanisms may be used to ensure coupling between the docking station and the portable electronic device. For example, there may be two dock side interface mechanisms, one for horizontal orientations and one for vertical orientations.

In one embodiment, the mechanical design of the docking station 12 is such that if the portable electronic device 14 is inserted horizontally or vertically or some angle therebetween, the interface mechanisms still line up. For example, the docking station 12 may include X and/or Y registration features that help guide and align the portable electronic device in X and Y while allowing rotations about Z. In this embodiment, the platform defines the X/Y plane. Although X, Y and Z coordinates are used, it should be appreciated that this is done for ease of discussion and therefore the invention is not limited to X, Y, Z coordinates.

The registration features may for example be shelves or pins that abut the edge of the portable electronic device 14 thereby registering the portable electronic device 14 relative to the docking station 12 regardless of the orientation of the portable electronic device 14 (e.g., equal X and Y). In one implementation, the registration features only support one orientation of horizontal and vertical as for example 0 and 90 degree orientations (see for example FIGS. 4A-C). In another implementation, the registration features support multiple orientations of horizontal and vertical as for example 0, 90, 180 and 270 (see for example FIGS. 5A-C and 6). In yet another implementation, the registration features support all angles through 360 degrees (see for example FIG. 7).

Figure 4A:
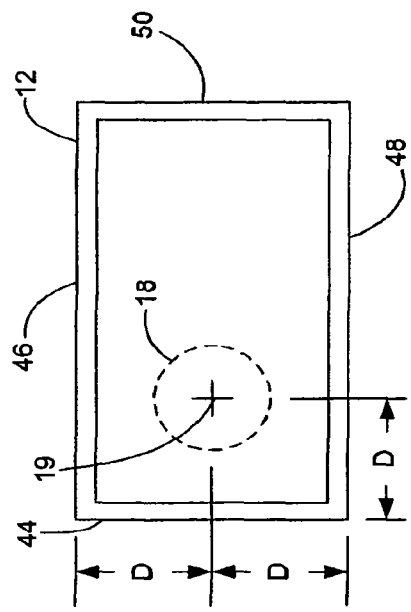
FIG. 4A is a front view of a docking station, in accordance with one embodiment of the present invention.
Figure 4B:
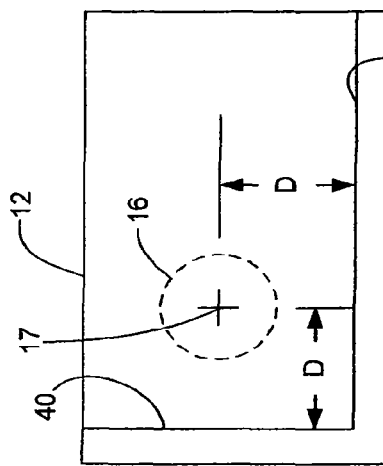
FIG. 4B is a front view of a docking station with a horizontally positioned portable electronic device positioned thereon, in accordance with one embodiment of the present invention.
Figure 4C:
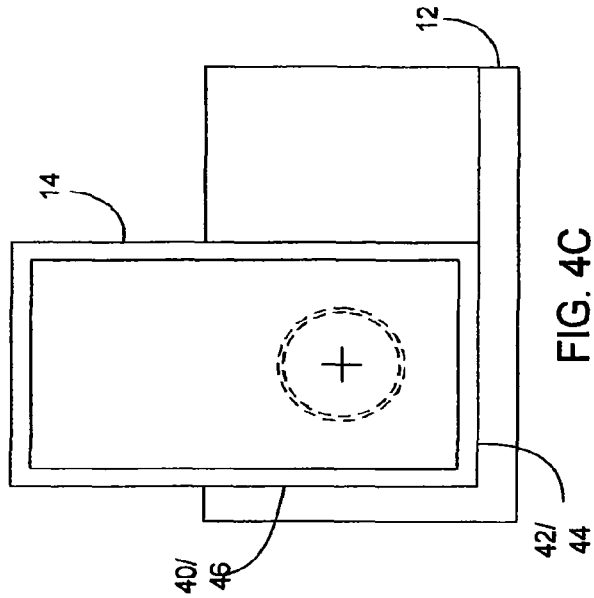
FIG. 4C is a front view of a docking station with a vertically positioned portable electronic device positioned thereon, in accordance with one embodiment of the present invention.

Referring to FIGS. 4A-C, in one embodiment, the mechanical design of the docking station 12 is configured to only support one orientation of horizontal and vertical as for example 0 and 90 degree orientations. As shown, the docking station 12 includes an X alignment surface 40 and a Y alignment surface 42, which abut against the edges of the portable electronic device 14 when the portable electronic device 14 is placed either horizontally or vertically, and more particularly 0 and 90 degrees, in the docking station 12. The alignment surfaces 40 and 42 are configured to align the axis 19 of the device side interface mechanism 18 with the axis 17 of the of the dock side interface mechanism 16 in the X and Y directions for both 0 and 90 degree orientations.

The X alignment surface 40 is placed along the X axis of the platform 26 at a distance D from the axis 17 of the dock side interface mechanism 16, and the Y alignment surface 42 is placed along the Y axis of the platform 26 at the same distance D from the axis of the dock side interface mechanism 16.

The portable electronic device 14 includes four edges, a first edge 44, a second edge 46, a third edge 48 and a fourth edge 50. The device side mechanism 18 is placed the same distance D from the first, second and third edges 44, 46, and 48 of the portable electronic device 14.

When the device 14 is placed at horizontal 0 degrees in the docking station 12 (as shown in FIG. 4B), the first edge 44 abuts against the X alignment surface 40 and the third edge 48 abuts against the Y alignment surface 42. Because the interface mechanisms 16 and 18 are located the same distance in the X and Y locations from the abutted edges, the interface mechanisms 16 and 18 are aligned when positioned in this manner.

When the device is placed at vertical 90 degrees in the docking station 12 (as shown in FIG. 4C), the first edge 44 abuts the Y alignment surface 42 and the second edge 46 abuts the X alignment surface 40. Because the interface mechanisms 16 and 18 are located the same distance in the X and Y locations from the abutted edges, the interface mechanisms 16 and 18 are aligned when positioned in this manner.

Referring to FIG. 5, in another embodiment, the mechanical design of the docking station 12 is configured to support multiple orientations of horizontal and vertical as for example 0, 90, 180 and 270 degree orientations. As shown, the docking station 12 includes first and second alignment systems 60 and 62. The first alignment system 60 is configured to align the portable electronic device 14 in horizontal orientations including 0 and 180 degrees and the second alignment system 62 is configured to align the portable electronic device 14 in vertical orientations including 90 and 270 degrees. Each alignment system 60 or 62 includes spaced apart X alignment surfaces 64 and a Y alignment surface 66. The spacing of the X alignment surfaces 64A of the first alignment system 60 coincide with the length L of the portable electronic device 14 (horizontal). The spacing of the X alignment surfaces 64B of the second alignment system 62 coincide with the width W of the portable electronic device 14 (vertical).

The X and Y alignment surfaces may for example protrude from the platform 26 so as to form recesses within which the portable electronic device 14 is placed, i.e., constrains the portable electronic device in X and Y. In one implementation, the depth of the recess coincides with the thickness of the portable electronic device so that the face of the alignment surfaces are flush with the front surface of the portable electronic device 14.

The X alignment surfaces 64A of the first alignment system 60 are placed at a distance D1 from the center 17 of the dock side interface mechanism 16, and the Y alignment surface 66A of the first alignment system 60 is placed at a distance D2 from the center 17 of the dock side interface mechanism 16. Furthermore, the X alignment surfaces 64B of the second alignment system 62 are placed at the distance D2 from the center 17 of the dock side interface mechanism 16, and the Y alignment surface 66B of the second alignment system 62 is placed at the distance D1 from the center 17 of the dock side interface mechanism 16.

Moreover, the center 19 of the interface mechanism 18 of the portable electronic device 14 is positioned in the center of the portable electronic device 14. The portable electronic device 14 includes four edges, a first edge 44, a second edge 46, a third edge 48 and a fourth edge 50. The device side mechanism 18 is placed a distance D1 from the first and fourth edges 44 and 50 of the portable electronic device 14, and a distance D2 from the second and third edges 46 and 48 of the portable electronic device 14.

When the device 14 is placed at horizontal 0 or 180 degrees in the docking station 12 (as shown in FIG. 5B), the first and fourth edges 44 and 50 abut against the X alignment surfaces 64A of the first alignment system 60, and the second or third edges 46 or 48 abut against or rest on the Y alignment surface 66A of the first alignment system 60. Edge 46 rests on the Y alignment surface 66A at the 0 degree orientation, and edge 48 rests on the Y alignment surface 66A at the 180 degree orientation. Because the interface mechanisms 16 and 18 are located the same distances in the X and Y locations from the abutted edges, the interface mechanisms 16 and 18 are aligned when positioned in this manner.

When the device 14 is placed at horizontal 90 or 270 degrees in the docking station 12 (as shown in FIG. 5C), the second and third edges 46 and 48 abut against the X alignment surfaces 64B of the second alignment system 62, and the first or fourth edges 44 and 50 abut against or rest on the Y alignment surface 66B of the second alignment system 62. Edge 44 rests on the Y alignment surface 66B at the 90 degree orientation, and edge 50 rests on the Y alignment surface 66B at the 270 degree orientation. Because the interface mechanisms 16 and 18 are located the same distances in the X and Y locations from the abutted edges, the interface mechanisms 16 and 18 are aligned when positioned in this manner.

Figure 6:
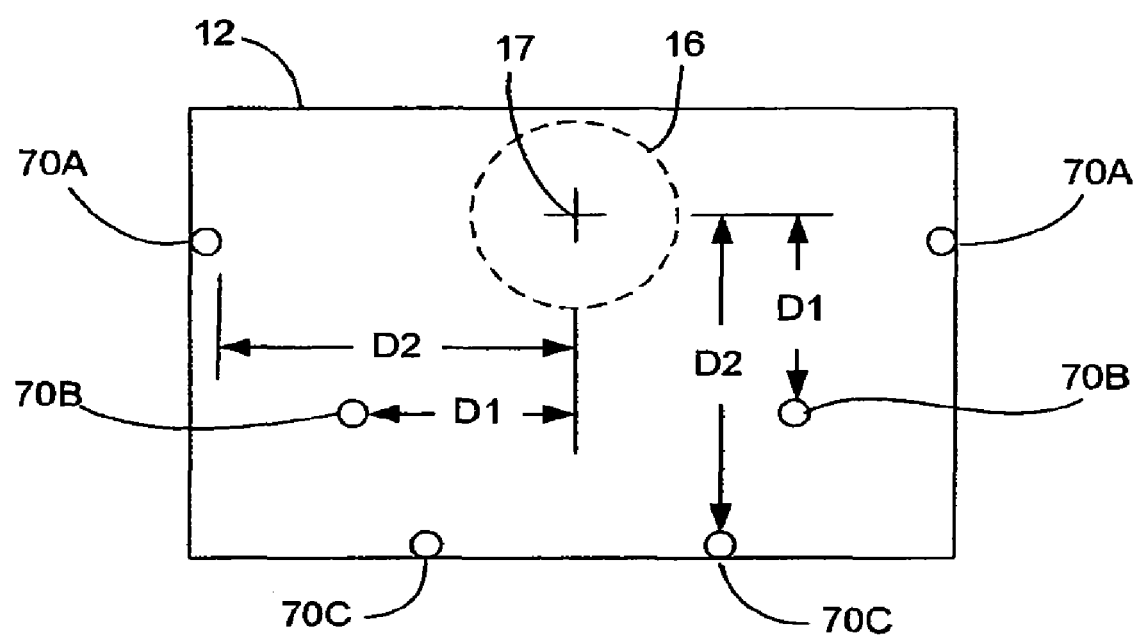
FIG. 6 is a front view of a docking station, in accordance with one embodiment of the present invention.

FIG. 6 is similar to the embodiment shown in FIG. 5 except that posts or guides 70 are used rather than elongated surfaces.

As shown, the docking station 12 includes a first set of posts 70A for aligning the portable electronic device 14 in the X direction when the portable electronic device 14 is placed horizontally into the docking station 12. The first set of posts 70A are analogous to the X alignment surfaces of the first alignment system in FIG. 5.

The docking station 12 also includes a second set of posts 70B for aligning the portable electronic device 14 in the X direction when the portable electronic device 14 is placed vertically into the docking station 12. The second set of posts 70B also align the portable electronic device 14 in the Y direction when the portable electronic device 14 is placed horizontally into the docking station 12. The second set of posts 70B are analogous to the X alignment surfaces of the second alignment system and the Y alignment surface of the first alignment system of FIG. 5.

The docking station 12 further includes a third set of posts 70C for aligning the portable electronic device 14 in the Y direction when the portable electronic device 14 is placed vertically into the docking station 12. The third set of posts 70C are analogous to the Y alignment surface of the second alignment system of FIG. 5.

It should be noted that the present invention is not limited to only alignment surfaces or only posts and that a combination of posts and alignment surfaces may be also be used.

Referring to FIG. 7, in another embodiment, the mechanical design of the docking station 12 is configured to support all orientations of the portable electronic device 14 through 360 degrees. As shown, the platform 26 of the docking station 12 includes a circular recess 80 and the portable electronic device 14 includes a circular protrusion 82 that is inserted into the circular recess 80. The circular protrusion 82 and the circular recess 80 have similar shapes, sizes so that they matingly engage, i.e., the outer perimeter of the circular protrusion 82 is placed within and against the inner perimeter of the circular recess 80. When engaged, the portable electronic device 14 is secured within the X/Y plane (platform) and is able to rotate through 360 degrees about the center of the circular protrusion/recess 80/82. That is, the edge of the protrusion 82 abuts the edge of the recess 80 thereby preventing linear motion in the X/Y plane. Further, because the elements are circular, the protrusion 82 is allowed to rotate within the recess 80.

In the illustrated embodiment, the interface mechanism 16 of the docking station is centered at the center of the circular recess 80, and the interface mechanism 18 of the portable electronic device 14 centered at the center of the circular protrusion 82. The recess/protrusion interface 80/82 is therefore configured to align the axis of the dock side interface mechanism 16 with the axis of the device side interface mechanism 18 while allowing the portable electronic device 14 full rotation about the axis, i.e., the portable electronic device can be rotated through 360 degrees without effecting the alignment. In most cases, the depth of the recess 80 is configured similarly to the depth of the protrusion 82 so that the front surface 84 of the recess 80 lies flush with the back surface 86 of the protrusion 82 when the protrusion 82 is inserted within the recess 80. This may also cause the backside of the portable electronic device 14 to lie flush with the remainder of the platform 26.

In some cases, the platform 26 may further include a slot 88 that guides the circular protrusion 82 to the circular recess 80. The slot 88 typically has a width that coincides with the diameter of the protrusion 82. The slot 88 may follow various paths within the X/Y plane. In the illustrated embodiment, the slot 88 extends from the top of the platform 26 to the circular recess 80 in the Y direction. The protrusion 82 therefore rests on the bottom surface of the circular recess 80 and is prevented from venturing upwards due to its weight (gravity). The slot 88 and recess 80 may further include a channel 90 along their edges for receiving a flange 92 of the circular protrusion 82. When engaged, the flange/channel allows the portable electronic device 14 to be slidably received and retained to the platform 26. In most cases, the flange/channel are dimensioned to place the backside of the circular protrusion 82 substantially flush with the front surface of the circular recess 80.

Although the recess and protrusion are described as circular, it should be appreciated that this is not a limitation. In some cases, the recess and protrusion may be square. This particular implementation is capable of supporting 0, 90, 180 and 270 orientations.

Figure 8:
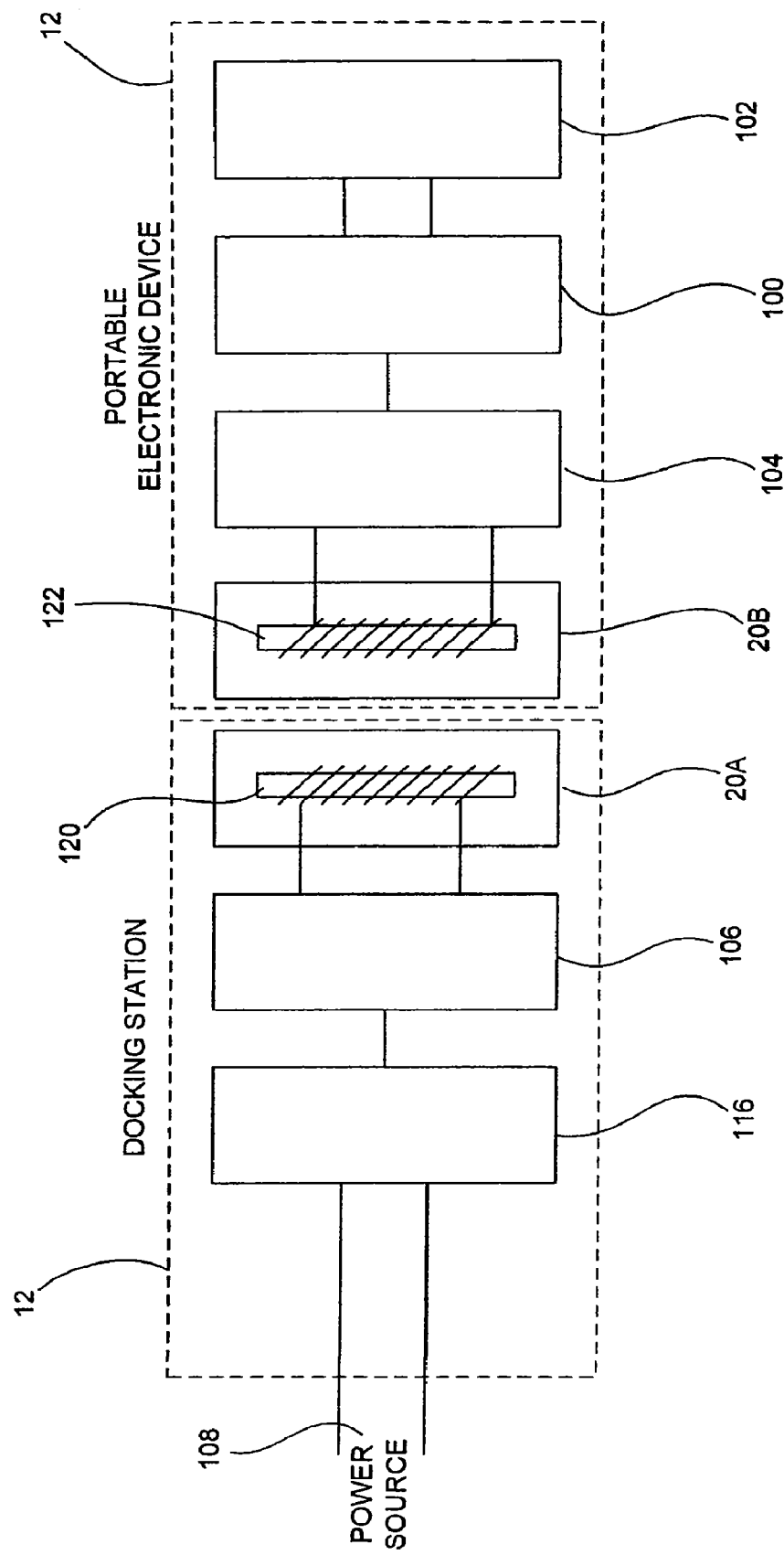
FIG. 8 is a diagram of a docking system, in accordance with one embodiment of the present invention.

Referring to FIG. 8, one embodiment of the docking system 10 will be described in greater detail. In this embodiment, the interface system includes opposing power transfer mechanisms 20 that are configured to be aligned along their center axis and substantially juxtaposed relative to one another when the portable electronic device 14 is placed in any orientation within the docking station 12. This can be accomplished using any of the docking systems described above. The opposing power transfer mechanisms 20 may be embodied as electrical contacts, inductors, and/or the like.

The power transfer mechanism 20B of the portable electronic device 14 is operatively coupled to a power management circuit 100 that controls the power operations of the portable electronic device 14. The power management circuit 100 may for example control power to various mechanisms within the portable electronic device 14. The power may be used to operate the portable electronic device 14 or alternatively to recharge a battery 102 of the portable electronic device 14. By way of example, the power management circuit 100 may be a dedicated power controller or alternatively may be part of a main processor of the portable electronic device.

If AC power is delivered through power transfer mechanisms 20, the portable electronic device 14 may further include a rectifier 104 that converts the AC power to DC power and/or adjusts DC power to an acceptable level.

The power transfer mechanism 20A of the docking station 12 is operatively coupled to a power management circuit 106 that controls power transmissions through the docking station 12. The power management circuit 106 is operatively coupled to a power source 108. This may for example be accomplished through a power cable 110 that connects to a power outlet 112 via a power plug 114.

If the docking station 12 is configured to transmit DC power to the electronic device 14, the docking station 12 may further include a transformer/rectifier 116 for converting AC power to DC power, which can be used directly by the portable electronic device 14.

In the illustrated embodiment, the opposing power transfer mechanisms 20 are inductively based and therefore the docking station 12 includes a primary inductive coil 120 and the portable electronic device 14 includes a secondary inductive coil 122 that cooperate to form a two part transformer. When the portable electronic device 14 is docked, the complete transformer is created, i.e., the inductors 120 and 122 are aligned along their axes and placed side by side without making electrical or mechanical contact. During power transfer, current is made to flow through the primary inductive coil 120. The resulting magnetic flux induces an alternating current through the magnetic field and across the secondary inductive coil 122 thereby completing the circuit. The AC power received by the secondary inductive coil 122 is converted to DC power for operating the portable electronic device 14 and/or for storage in the battery 102.

In one embodiment, the inductive coils 120 and 122 are rotationally symmetric about the axis so as to support the various orientations of the portable electronic device 14 relative to the docking station 12. In the case of 360 degree flexibility, the inductive coils may be circular. In the case of 0, 90, 180, 270, the inductive coils may be circular square, octagon, or the like.

Figure 9:
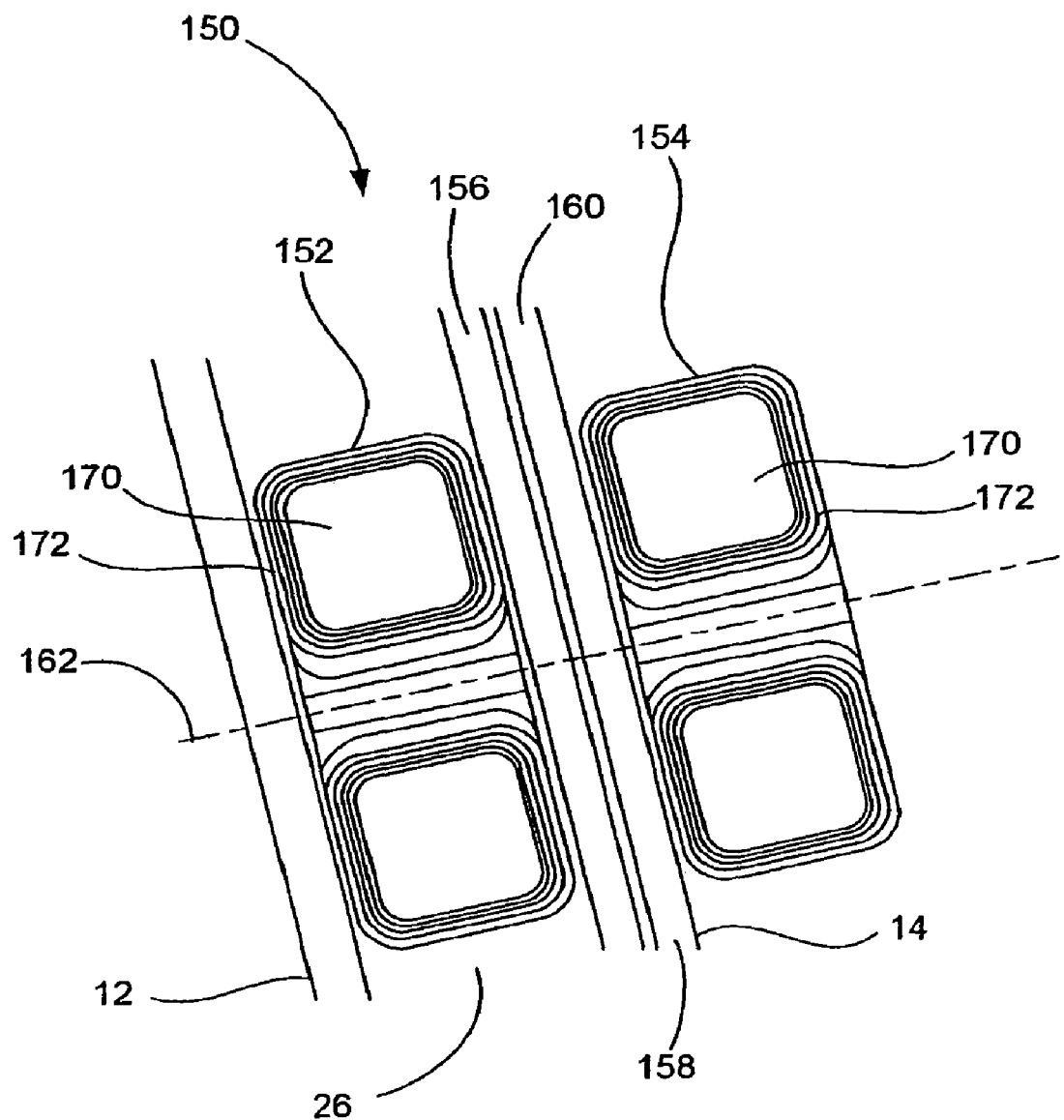
FIG. 9 is a side elevation view, in cross section, of an interface system that uses inductive coils, in accordance with one embodiment of the present invention.

FIG. 9 is a side elevation view, in cross section, of an inductively based charging system 150, in accordance with one embodiment of the present invention. The charging system 150 may for example be used in any of the embodiments described above. In this embodiment, the docking station 12 includes a first inductive coil 152, and the portable electronic device 14 includes a second inductive coil 154. The first inductive coil 152 is disposed inside the platform 26 behind the front wall 156 of the platform 26. The second inductive coil 154 is disposed inside the housing 158 of the portable electronic device 14 behind the back wall 160 of the portable electronic device 14. When the portable electronic device 14 is docked with the docking station 12, as for example when the back wall 160 of the device 14 is placed against the front wall 156 of the platform 26, the first and second coils 152 and 154 are juxtaposed and aligned along an axis of polar symmetry 162. This ensures an efficient coupling between the two coils 152 and 154. The inductive coils 152 and 154 may be aligned using any of the embodiments mentioned above.

To elaborate, the coils 152 and 154 generally include a permeable core 170 and wire windings 172 wrapped around the permeable core 170. The capacity of the inductor 152/154 is controlled by various factors including, the number of coils, the material the coils are wrapped around (the core), the cross sectional area of the coil. In small handheld computing device such as cell phones, PDAs or media players, the inductive coils are generally configured to transmit between about 3-5 Watts of power. In larger handheld computing devices such as Tablet PCs, the inductive coils are generally configured to transmit between about 15-25 Watts of power. One advantage of planar like electronic devices is that larger inductive coils may be used, i.e., spread across the planar surface.

In one embodiment, the inductive coils 152 and 154 are circular and further toroidal or doughnut shaped in order to ensure rotational symmetry about the axis 162 when the portable electronic device 14 is placed on the docking station 12.

Figure 10:
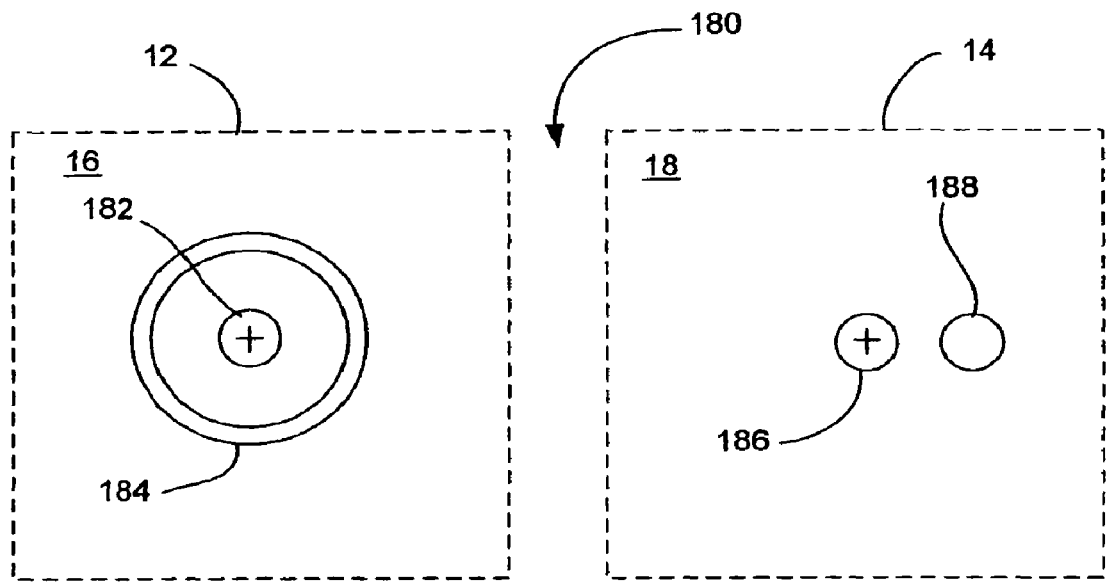
FIG. 10 is a diagram of an interface system that uses electrical contacts, in accordance with one embodiment of the present invention.

FIG. 10 is a diagram of a charging system 180 that uses electrical contacts, in accordance with one embodiment of the present invention. The system 180 provides 360 degree flexibility and may be used in any of the docking systems described above. As shown, the docking station 12 includes a center contact 182 and a spaced apart concentric outer contact 184. The center contact 182 and outer contact 184 are centered along the mating axis of the portable electronic device 14 and the docking station 12. The portable electronic device 14 may include a matching set of center and outer contacts, or some variation of the center and outer contacts. For example, as shown, the portable electronic device 14 includes a center contact 186 that is centered along the mating axis of the portable electronic device and the docking station, and a point based or segmented outer contact 188 that is located at the same radius as the concentric outer contact 184. A point based contact uses less space and is therefore more aesthetically pleasing.

When the portable electronic device 14 is docked with the docking station 12, as for example when the back side of the device 14 is placed against the platform 26, the center contacts 182 and 186 engage one another and the outer contacts 184 and 188 engage one another thereby allowing electrical signals (data and/or power) to pass between the docking station 12 and the portable electronic device 14. In the case of power contacts, for example, the outer contacts 184, 188 may deliver the driving current to the battery or power manager of the portable electronic device 14 and the center contacts 182/186 may deliver the return current (e.g., ground) to the docking station 12 (or vice versa).

Alternatively, the configuration described above can be reversed, i.e., the concentric outer contact is placed on the portable electronic device 14 and the point based or segmented contact is placed on the docking station 12. Either configuration allows 360 degree flexibility.

In one implementation, at least one set of electrical contacts is spring-loaded outwardly in order to ensure good electrical contact, and the opposing set of electrical contacts are flush or recessed mounted. For example, the docking station 12 may include spring loaded or flexure based electrical contacts or tabs that are biased outwardly from the front surface of the platform 26, and that move inwardly under the force of the portable electronic device 14 when the portable electronic device 14 is placed against the platform 26. The portable electronic device 14, on the other hand, may include electric contacts or tabs that are flush mounted in the surface of the portable electronic device 14. By flush it is meant that the outer surface of the electrical contact is substantially level with the outer surface of the housing of the portable electronic device 14.

Figure 11:
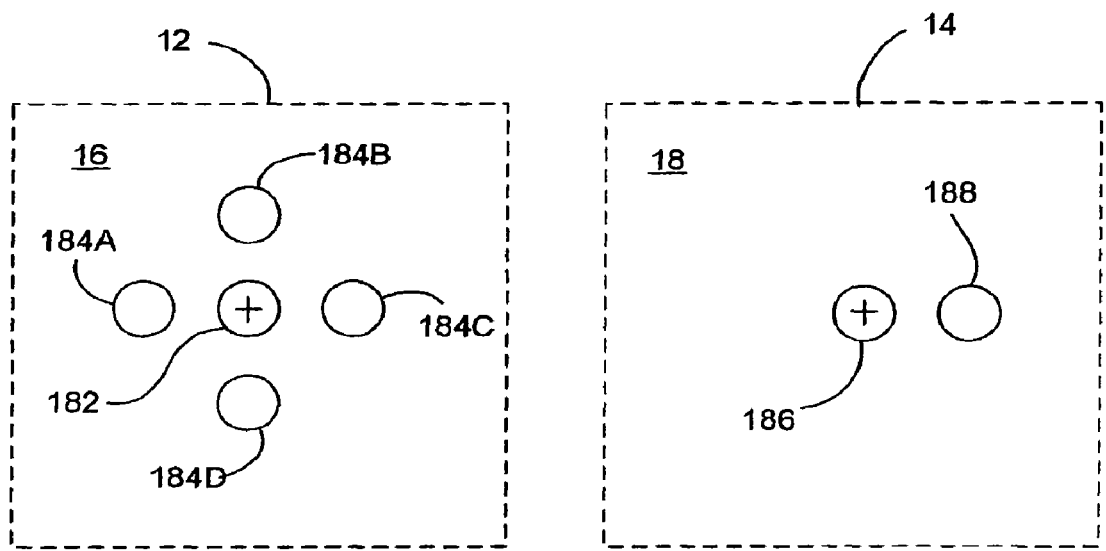
FIG. 11 is a diagram of an interface system that uses electrical contacts, in accordance with one embodiment of the present invention.

Referring to FIG. 11, the outer concentric outer contact 184 described above may be segmented instead of continuous. In this embodiment, the segmented outer contacts 184A-D are positioned at locations that support the orientations of the portable electronic device 14. In the illustrated embodiment, the segmented outer contacts are positioned at 0, 90, 180, and 270 degrees such that they support four orientations including two vertical orientations and two horizontal orientations. The portable electronic device 14 may include a matching set of contacts or some subset of contacts depending on the various needs of the portable electronic device 14. In the illustrated embodiment, the portable electronic device 14 includes a center contact 186 and one outer contact 188 similar to the embodiment described in FIG. 10. The center contact 186 mates with the center contact 182 of the docking station 12, and the outer contact 188 can optionally mate with any of the outer contacts 184A-D of the docking station 12. That is, the single outer contact can be positioned at any one of the positions 0, 90, 180, 270 ensuring that the outer contacts engage one another at each of the various orientations. The outer contacts 184A-D are redundant, i.e., they are connected to the same power line (e.g., driving or return).

Figure 12A:
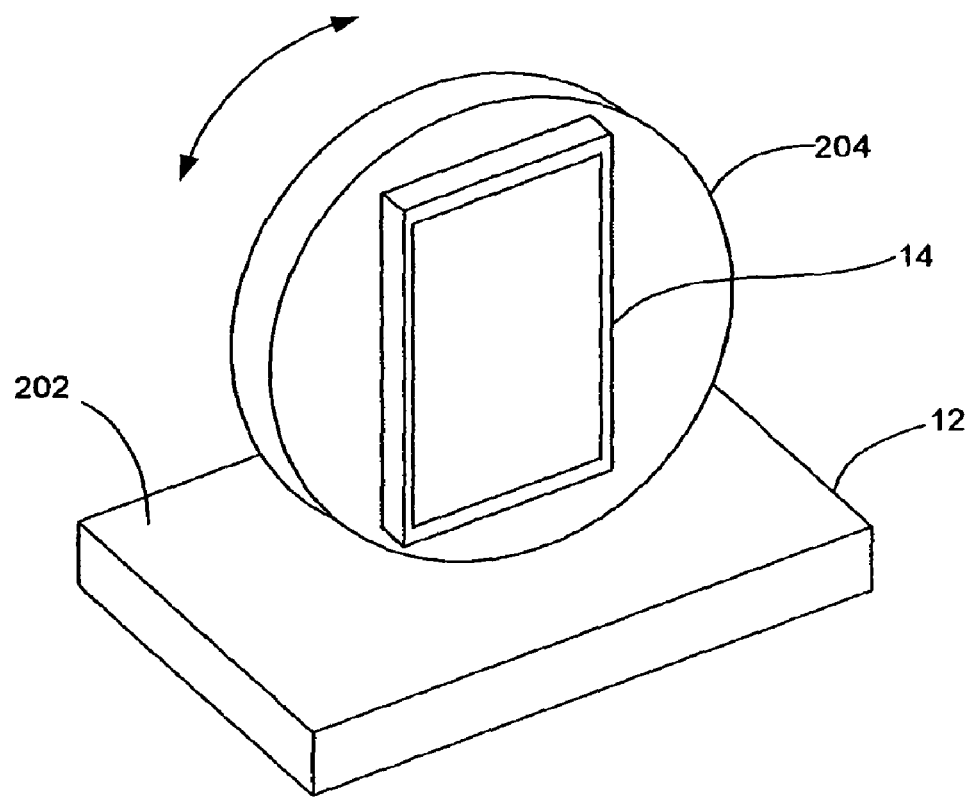
FIGS. 12A and 12B are diagrams of another style of docking system, in accordance with one embodiment of the present invention.
Figure 12B:
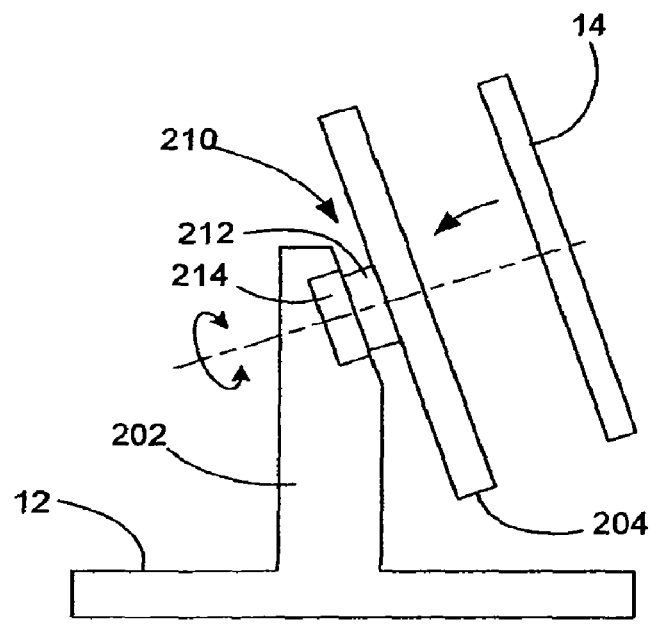

FIGS. 12A and 12B are diagrams of another style of docking system 200, in accordance with one embodiment of the present invention. In this embodiment, the docking station 12 includes a base 202 and a rotational platform 204 that are mechanically and operatively coupled together. The base 202 is configured to rotationally support the rotational platform 204, and the rotational platform 204 is configured to attachably receive a portable electronic device 14, particularly one with a planar back side and one that operates in multiple orientations.

The base 202 includes connectivity to other devices or systems. The base 202 may for example include additional data ports, audio ports, video ports, and power ports. The base 202 may also include elements for increasing the functionality of the portable electronic device 14 when it is attached to the platform 204. For example, the base 202 may include additional processing capabilities.

The rotational platform 204, on the other hand, includes connectivity to the portable electronic device 14. By way of example, the platform 204 may include a series of contact or non-contact based mechanisms for communicating with the portable electronic device 14 when the portable electronic device 14 is attached to the platform 204. For example, the platform 204 may include any of the interface mechanisms described above. Alternatively, because the portable electronic device 14 is fixed to the platform 204, rotationally symmetric interface mechanisms are not necessary. As such, the interface mechanisms may also be embodied as a connector/port arrangement. For example, the portable electronic device 14 may include a data and/or power port that interfaces with a corresponding data and/or power connector on the platform 204. An example of a connector arrangement that may be used is described in Ser. No. 10/423,490, which is herein incorporated by reference.

The manner in which the rotational platform 204 is rotatable may be widely varied. By way of example, the rotational platform 204 may be rotatably coupled to the base 202 via an axle arrangement 210. For example, the platform 204 may include an axle 212 that is rotatably retained in a collar 214 on the base 202. In one embodiment, the axle/collar interface includes an arrangement of slip rings in order to route the electrical signals between the rotational platform 204 and the base 202. The axle/collar interface may additionally include frictional elements or detents that are capable of holding the rotational platform 204 in various orientations about the rotational axis. For example, frictional elements may be used to allow 360 degree flexibility and detents may be used to support 0, 90, 180 and 270 degree orientations.

The manner in which the portable electronic device 14 is removably attached may be widely varied. By way of example, snaps, latches, catches, lips, slots, tabs, locks, etc. may be used. When detached, the portable electronic device 14 can be operated as a remote device independent of the docking station 12. When attached, the portable electronic device 14 is fixed to the rotational platform 204 and therefore it becomes an extension of the docking station 12. In order to change the orientation of the portable electronic device 14, the rotational platform 204, which now carries the portable electronic device 14, rotates around the rotational axis of the axle arrangement 210. That is, the portable electronic device 14 is capable of rotating with the rotational platform 204 in order to support the various orientations of the portable electronic device 14.

In one embodiment, the base 202 serves as a hub for downloading content onto the portable electronic device 14. For example, the portable electronic device 14 may correspond to a video player, and the base 202 may serve as a location for downloading video such as movies onto the video player. The portable electronic device 14 may correspond to an electronic book, and the base 202 may serve as a location for downloading book content onto the electronic book. The portable electronic device 14 may correspond to a music player, and the base 202 may serve as a location for downloading songs onto the music player. The portable electronic device 14 may correspond to a tablet, and the base 202 may serve as a location for accessing the internet or connecting to peripheral devices such as printers, fax machines, scanners, and the like.

In another embodiment, the base 202 is a general purpose computer such as any of those manufactured by Apple Computer Inc., of Cupertino, Calif. In cases such as these the portable electronic device 14 may correspond to a monitor, tablet PC or even a device with limited computational abilities, i.e., a device with dedicated functionality.

FIG. 13 is a perspective diagram of another docking system 220, in accordance with one embodiment of the present invention. In this embodiment, the docking station 12 includes a base 222 and a multi degree of freedom platform 224. The platform 224 is coupled to an arm 226 via multi pivot joint 228 such as a ball and socket joint, and the arm 226 is coupled to the base 222 via a second multi pivot joint 230 such as a ball and socket joint. Each of the joints 228 and 230 includes retention features for holding various positions and angles. Generally speaking, this arrangement allows the platform 224 to yaw, pitch and roll as well as to translate in x, y and z. The user can therefore adjust the position of the platform 224 to the best position for use. As shown, the portable electronic device 14 is configured to be attached to the platform 224, i.e., the portable electronic device plugs into the platform.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A docking station configured to mechanically accept and operatively interface with a portable electronic device having a first electrical interface, the docking station comprising:
    a platform having a surface for receiving a backside of the portable electronic device, the platform including a second electrical interface;
    a leg that supports the platform, wherein the leg is configured to support the docking station such that the portable electronic device is in an upright position when its backside is being received by the surface of the platform,
    wherein the portable electronic device is capable of interfacing with the docking station in multiple orientations relative to the platform, wherein the multiple orientations include a first orientation and a second orientation, wherein:
        the second electrical interface is configured for transferring power to the first electrical interface when the portable electronic device is in the first orientation; and
        the second electrical interface is further configured for transferring power to the first electrical interface when the portable electronic device is in the second orientation; and
    wherein the first electrical interface includes a first center contact and a first outer contact, wherein the second electrical interface includes a second center contact and at least one second outer contact, wherein the first center contact is aligned with the second center contact when the portable device is in the first orientation and in the second orientation.

2. The docking system as recited in claim 1, wherein the second outer contact forms a concentric ring around the second center contact, and wherein a distance from the second center contact to the concentric ring is equal to a distance from the first center contact to the first outer contact.

3. The docking system as recited in claim 1, wherein the at least one second outer contact includes a plurality of segmented outer contacts, each equidistant from the second center contact, and wherein a distance from the second center contact to the segmented outer contacts is equal to a distance from the first center contact to the first outer contact.

4. The docking system as recited in claim 1, wherein the first and second electrical interfaces are rotationally symmetric about an axis so as to ensure transfer of power if the portable electronic device is in the first orientation and if the portable electronic device is in the second orientation.

5. The docking system as recited in claim 1, wherein the first electrical interface and the second electrical interface are aligned along an axis and juxtaposed relative to one another when the portable electronic device is respectively supported by the platform in the first orientation and in the second orientation, and
    wherein a first of the one or more alignment features supports only the first orientation and a second of the one or more alignment features supports only the second orientation, the first orientation being vertical, the second orientation being horizontal.

6. The docking system as recited in claim 5, further comprising:
    one or more alignment features for aligning the first electrical interface and the second electrical interface along the axis in the first orientation and along the axis in the second orientation.

7. The docking station as recited in claim 6, wherein the one or more alignment features support a plurality of orientations including the first orientation and the second orientation and at least one other orientation, the first orientation being vertical, the second orientation being horizontal.

8. The docking station as recited in claim 6, wherein the one or more alignment features support all angles through 360 degrees.

9. A docking station configured to mechanically accept and operatively interface with a portable electronic device having a first electrical interface, the docking station comprising:
    a platform having a surface for receiving a backside of the portable electronic device, the platform including a second electrical interface;
    a leg that supports the platform, wherein the leg is configured to support the docking station such that the portable electronic device is in an upright position when its backside is being received by the surface of the platform,
    wherein the portable electronic device is capable of interfacing with the docking station in multiple orientations relative to the platform, wherein the multiple orientations include a first orientation and a second orientation, and
    wherein:
        the second electrical interface is configured for transferring power to the first electrical interface when the portable electronic device is in the first orientation; and
        the second electrical interface is further configured for transferring power to the first electrical interface when the portable electronic device is in the second orientation; and
        the first electrical interface and the second electrical interface are aligned along an axis and juxtaposed relative to one another when the portable electronic device is respectively supported by the platform in the first orientation and in the second orientation; and
    one or more alignment features for aligning the first electrical interface and the second electrical interface along the axis in the first orientation and along the axis in the second orientation,
    wherein a first of the one or more alignment features supports only the first orientation and a second of the one or more alignment features supports only the second orientation, the first orientation being vertical, the second orientation being horizontal.

10. The docking system as recited in claim 9, wherein the coupling between the first electrical interface and the second electrical interface is inductive based.

11. A docking station configured to mechanically accept and operatively interface with a portable electronic device having a first electrical interface, the docking station comprising:
a platform having a surface for receiving a backside of the portable electronic device, the platform including a second electrical interface;
a leg that supports the platform, wherein the leg is configured to support the docking station such that the portable electronic device is in an upright position when its backside is being received by the surface of the platform,
wherein the portable electronic device is capable of interfacing with the docking station in multiple orientations relative to the platform, wherein the multiple orientations include a first orientation and a second orientation, wherein:
the second electrical interface is configured for transferring power to the first electrical interface when the portable electronic device is in the first orientation; and
the second electrical interface is further configured for transferring power to the first electrical interface when the portable electronic device is in the second orientation; and
the first electrical interface and the second electrical interface are aligned along an axis and juxtaposed relative to one another when the portable electronic device is respectively supported by the platform in the first orientation and in the second orientation;
one or more alignment features for aligning the first electrical interface and the second electrical interface along the axis in the first orientation and along the axis in the second orientation,
wherein the one or more alignment features support all angles through 360 degrees; and
wherein the platform includes a recess into which a protrusion from the portable electronic device fits, and wherein the recess includes the second electrical interface, wherein the platform further includes a slot that guides a protrusion of the portable electronic device to the recess.

12. A docking system, comprising:
a portable electronic device, the portable electronic device including a first electrical interface; and
a docking station configured to mechanically accept and operatively interface with the portable electronic device, the docking station including:
a platform having a surface for receiving a backside of the portable electronic device, the platform including a second electrical interface; and
a leg that supports the platform, wherein the leg is configured to support the docking station such that the portable electronic device is in an upright position when its backside is being received by the surface of the platform,
wherein the portable electronic device is capable of interfacing with the docking station in multiple orientations relative to the platform, wherein the multiple orientations are upright and include a first orientation and a second orientation, and
wherein:
the second electrical interface is configured for transferring power to the first electrical interface when the portable electronic device is in the first orientation; and
the second electrical interface is further configured for transferring power to the first electrical interface when the portable electronic device is in the second orientation; and
wherein the first electrical interface includes a first center contact and a first outer contact, wherein the second electrical interface includes a second center contact and at least one second outer contact, wherein the first center contact is aligned with the second center contact when the portable device is in the first orientation and in the second orientation.

13. The docking system as recited in claim 12 wherein the portable electronic device is a handheld computing device.

14. The docking system as recited in claim 12, wherein the first and second electrical interfaces are rotationally symmetric about an axis so as to ensure transfer of power if the portable electronic device is in the first orientation and if the portable electronic device is in the second orientation.

15. The docking system as recited in claim 12, wherein the first electrical interface and the second electrical interface are aligned along an axis and juxtaposed relative to one another when the portable electronic device is respectively supported by the platform in the first orientation and in the second orientation.

16. The docking system as recited in claim 12, further comprising:
one or more alignment features for aligning the first electrical interface and the second electrical interface along the axis in the first orientation and along the axis in the second orientation.

17. The docking system as recited in claim 16, wherein the one or more alignment features support all angles through 360 degrees.

18. The docking system as recited in claim 17, wherein the platform includes a recess into which a protrusion from the portable electronic device fits, wherein the protrusion includes the first electrical interface, wherein the recess includes the second electrical interface, and wherein the platform further includes a slot that guides a protrusion of the portable electronic device to the recess.

* * * * *